(12) United States Patent (10) Patent No.: US 8,213,055 B2
Morovic et al. (45) Date of Patent: Jul. 3, 2012

(54) COLOR SEPARATION INTO NEUGEBAUER PRIMARY AREA COVERAGE VECTORS

(75) Inventors: Jan Morovic, Colchester (GB); Peter Morovic, Barcelona (ES); Michel Georges Encrenaz, Barcelona (ES); Johan Lammens, Barcelona (ES); Yvan Richard, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 689 days.

(21) Appl. No.: 12/390,214

(22) Filed: Feb. 20, 2009

(65) Prior Publication Data

US 2010/0214576 A1 Aug. 26, 2010

(51) Int. Cl.
*H04N 1/405* (2006.01)
(52) U.S. Cl. ......................... 358/3.06; 358/2.1
(58) Field of Classification Search .............. 358/1.9, 358/2.1, 500, 504, 468, 3.03, 3.06, 3.12, 358/3.24, 1.13
See application file for complete search history.

(56) References Cited

U.S. PATENT DOCUMENTS

| | | | |
|---|---|---|---|
| 5,416,890 A | 5/1995 | Beretta | |
| 5,450,216 A | 9/1995 | Kasson | |
| H1506 H | 12/1995 | Beretta | |
| 5,553,199 A | 9/1996 | Spaulding et al. | |
| 5,583,666 A | 12/1996 | Ellson et al. | |
| 5,809,213 A | 9/1998 | Bhattacharjya | |
| 6,081,344 A * | 6/2000 | Bockman et al. | 358/1.9 |
| 6,229,626 B1 | 5/2001 | Boll | |
| 6,381,361 B1 | 4/2002 | Silverbrook et al. | |
| 6,459,425 B1 | 10/2002 | Holub et al. | |
| 6,480,299 B1 | 11/2002 | Drakopoulos et al. | |
| 6,654,143 B1 * | 11/2003 | Dalal et al. | 358/1.9 |
| 6,724,500 B1 | 4/2004 | Hains et al. | |
| 6,972,869 B2 | 12/2005 | Harrington | |
| 7,075,643 B2 | 7/2006 | Holub | |
| 7,110,142 B2 * | 9/2006 | Mestha et al. | 358/1.9 |
| 7,177,465 B1 | 2/2007 | Takahira | |
| 7,233,413 B2 | 6/2007 | Jones et al. | |
| 7,411,701 B2 | 8/2008 | Boll | |
| 7,421,117 B2 | 9/2008 | Kondo et al. | |

OTHER PUBLICATIONS

U.S. Appl. No. 12/390,214.

* cited by examiner

*Primary Examiner* — Thomas D Lee
*Assistant Examiner* — Stephen M Brinich

(57) ABSTRACT

The disclosure describes methods for color printing, performing a color separation process and performing a halftoning process. Furthermore, the disclosure describes the color separation process determining one or more Neugebauer Primaries, tessellating the Neugebauer Primaries, and generating one or more Neugebauer Primary area coverage vectors, whose area coverages are linear with respect to a device-independent color space. The disclosure further describes that the color separation process communicates with the halftoning process using one or more Neugebauer Primary area coverage vectors.

16 Claims, 5 Drawing Sheets

COLOR SEPARATION INTO NEUGEBAUER PRIMARY AREA COVERAGE VECTORS

BACKGROUND

To accurately reproduce a desired target color using a printing system, an operator must perform repeated color adjustments by trial and error. In particular, the operator might adjust the color of an image on a video display in an attempt to obtain the desired target color on a color printer. After printing that first image using the color printer, the operator must perform a second color adjustment on the video display, wherein the adjustments are based on observations of the first printed image. This process would be repeated until the desired color print is output.

Such trial and error generally involves the process of color separation. In the past, color separation has traditionally been a matter of deciding what quantities of each of several inks (or other colorants) to use to achieve a given color. While this functionality was originally a photochemical process involving colored filters, it has evolved to its current state, which utilizes look-up tables comprising colorimetric input values or input values in a device color space. The output values for the tables may be n-dimensional ink vectors, where n is the number of inks used by the printer and the vector components represent quantities of each ink available on the color printer. In practice, the current approach utilizes these tables to transform ink amounts for each color plane, thereby reproducing the desired target color.

However, controlling print color by variation of ink amounts is a highly non-linear process, deriving from a complex relationship between changes in the quantity of each ink color used and the color of the resulting printed ink combination. As a result of this non-linearity, the gamut (the set of all printable colors) of a printing device may also include concavities when plotted in a three dimensional color space. These concavities in some cases result in only relatively dull dark colors being printable. In addition, small changes in a system comprising non-linear relationships may also result in unacceptably large changes in output color. Therefore, non-linear relationships in a printing system may make it very challenging to obtain printing properties such as smooth transitions between colors, cost per copy, color constancy, and grain.

Therefore, there is a need for improving color printing in a printing system. Further, there is a need for color reproduction accuracy, minimized ink usage, improved spectral printing, and highly dynamic printing ranges.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary methods for addressing a printer in a printing system. The disclosure describes a method of color printing, performing a color separation process and performing a halftoning process. Furthermore, the disclosure describes communication between the halftoning process and the color separation process using one or more Neugebauer Primaries (NPs).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes various exemplary methods and computer products for printing a document in a printing system. In particular, this disclosure describes choosing Neugebauer Primary area coverage (NPac) vector, including up to all of an ink set's $k^n$ Neugebauer primaries (NPs), followed by a halftoning process to generate the corresponding halftone patterns based upon the Neugebauer Primary area coverages. In one implementation, the Neugebauer Primaries are all the possible combinations of a set of n inks. Each ink within the set may be at one of k levels for a single halftone pixel, where there are $k^n$ combinations for each ink set defining all of the possible ink configuration states that a single pixel can have. For example, where k=2 for a binary (or bi-level) printer, the printer is able to use either no ink or one drop of ink at a single pixel per ink channel. Given that NPacs represent linear, convex combinations of NPs (with relative area coverages being the convex weights), and as all of a printing system's NPacs are accessible, all colors inside the convex hull of a printing system's Neugebauer primaries' colors can be addressed.

This disclosure further describes printing and measuring up to all of an ink set's Neugebauer primaries (NPs), computing the convex hull of the measurements, tessellating the convex hull using at least the convex hull vertices, and for any color inside the convex hull, finding the enclosing tetrahedron and determining the weights with which the vertices can be combined to give the chosen color, where the weights are the relative area coverages needed for each of the vertex NPs.

The printing system described herein is not limited to any particular application, but may be applied to many contexts and environments.

Exemplary Printing System

Figure 1:
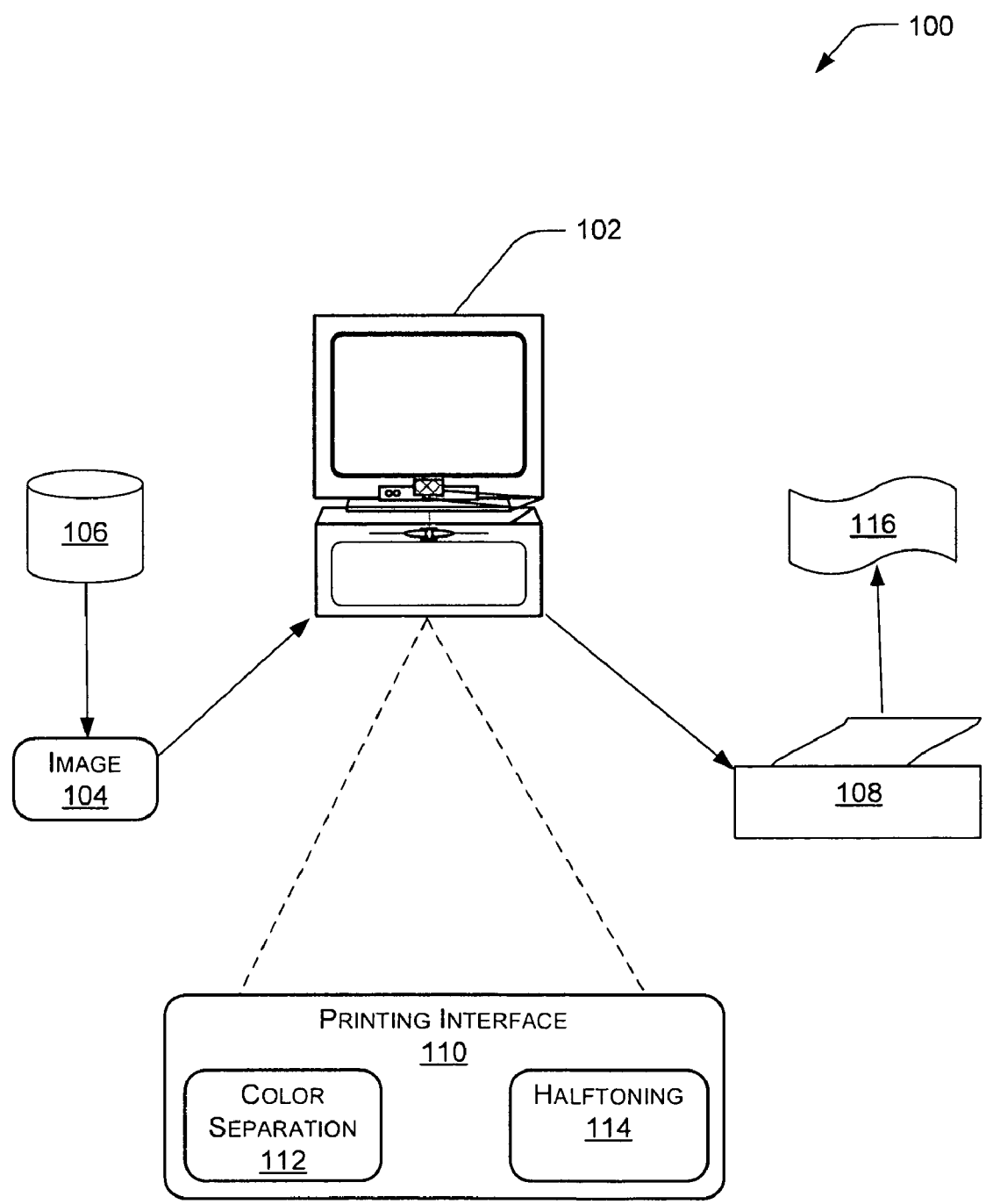
FIG. 1 illustrates an exemplary implementation of a printing system for addressing a printer in the printing system.

FIG. 1 illustrates an exemplary printing system and image processing 100, and describes aspects of addressing a printer in the printing system 100. Printing system 100 can be implemented, at least in part, by one or more suitable computing devices, such as computing device 102. Other computing devices that may be used include, but are not limited to, a personal computer, a laptop computer, a desktop computer, a digital camera, a personal digital assistance device, a cellular phone, a video player, and other types of image sources.

In one implementation, an image 104 is uploaded to the computing device 102 using input device 106. In other implementations, the image may be retrieved from a previously generated image set contained on a storage media, or retrieved from a remote storage location, such as an online application, using the Internet. Image 104 may be a still digital image created by a digital camera, a scanner, or the like. In other implementations the image may be a moving image such as a digital video. Image 104 may be sent to an output device such as printing device 108 by the computing device 102. Other printing devices that may be used include, but are not limited to, a dot-matrix printer, an inkjet printer, a laser printer, line printer, a solid ink printer, and a digital printer. In other implementations, the image may be displayed to a user on an output device 108 including, but not limited to, a TV set of various technologies (Cathode Ray Tube, Liquid Crystal Display, plasma), a computer display, a mobile phone display, a video projector, a multicolor Light Emitting Diode display, and the like.

In one implementation, printing system 100 employs a printing interface and image processing system 110 referred to as Halftone Area Neugebauer Separation (HANS). HANS may be executed using computing device 102. However, in other implementations, HANS may be executed using the printing device 108.

HANS changes the space in which a color separation process 112 and a halftoning process 114 communicate. In one example of a separation performed using HANS, the channels connecting the color separation process and the halftoning process communicate using aspects associated with Neugebauer Primary Area Coverage (NPac). In one implementation, the NPacs utilize a set of equations referred to as the Neugebauer equations. Neugebauer equations are tools for characterizing color printing systems based upon halftoning techniques. The Neugebauer equations, are associated with colors referred to as the Neugebauer Primaries, which in a binary (bi-level) printing device, are the $2^n$ combination of n inks, wherein the application of each of the n inks is at either 0% or 100% within an n-dimensional ink space. Generally, the number of Neugebauer Primaries (NPs) is $k^n$, where k is the number of levels at which an ink can be used and n is the number of inks. For example, for a printer comprising six different inks either 0, 1, or 2 drops of each ink may be specified at each halftone pixel, resulting in $3^6$ or 729 Neugebauer Primaries (NPs).

The printing device 108 will direct the image 104 to be printed upon a substrate 116 as dictated by the HANS printing process. The substrate 116 may include, without limitation, any variety of paper (lightweight, heavyweight, coated, uncoated, paperboard, cardboard, etc.), films, foils, textiles, fabrics, or plastics.

It should be noted that while printing system 100 is described in the context of image processing in a computing environment, it is to be appreciated and understood that it can be employed in other contexts and environments involving other types of data processing without departing from the spirit and scope of the claimed subject matter.

Exemplary Printing Process

Color printing is the reproduction of an image or text in color on substrate 116. A technique which may be used to print full-color images, such as photographs, is a four-color process printing. In one implementation, a four-color printing process includes three primary color inks and the color black (K). The primary ink colors include, but are not limited to, cyan (C), magenta (M), and yellow (Y). This four-color process, referred to as CMYK, is a subtractive process.

In another implementation, a technique which may be employed in the color printing process includes an additive color model. An example additive process is a model such as red, green, blue, (RGB). An additive process involves the light emitted directly from a source. Furthermore, the additive process combines the primary colors RGB to produce secondary primary colors cyan, magenta and yellow.

As discussed above, the printing interface 110 implements two main processes, the first of which is color separation. Color separation involves representing a color image as a combination of several single-color images corresponding to available ink colors, or printable elementary colors, in a printing system. In one example, the color image is represented as a combination of 3 or more single-color layers. These single color layers may include, but are not limited to, a cyan layer, a magenta layer, and a yellow layer.

Figure 2:
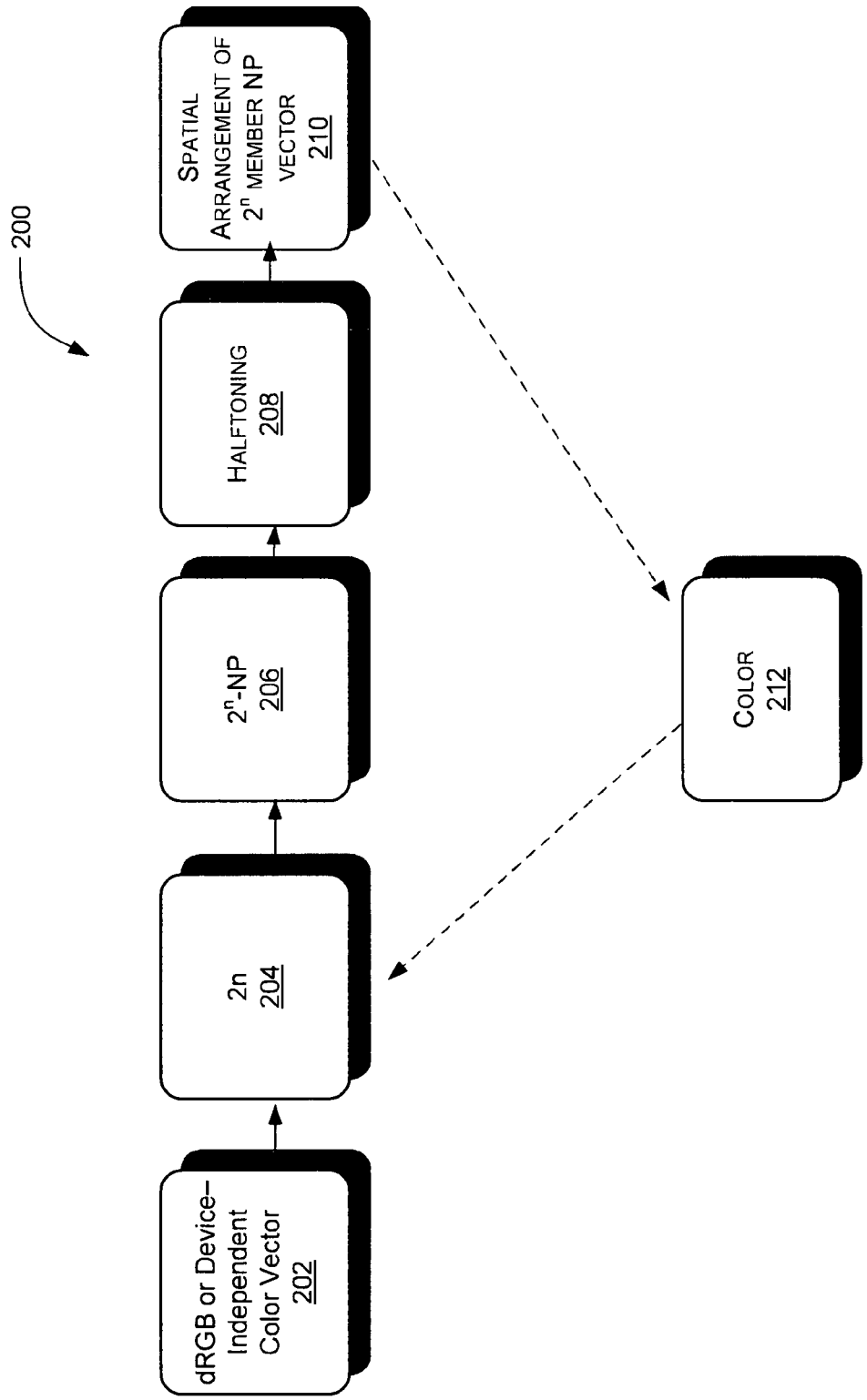
FIG. 2 illustrates a block diagram of an exemplary implementation of a printing process flow according to the printing system of FIG. 1.

FIG. 2 illustrates an exemplary printing process 200. In one implementation, the printing process 200 includes an exemplary color separation process and an exemplary halftoning process.

In one implementation, color separation may be discussed in the context of area coverage of an ink combination. In this example, the area coverage is calculated using a Neugebauer Model. However, in other implementations the area coverage may be calculated using other models.

The combination of the number of inks available in printing system 100 may be referred to as Neugebauer Primaries (NPs). For a binary (bi-level) printer, a Neugebauer Primary is one of $2^n$ combinations of n inks within the printing system 100, wherein ink concentrations are at 0% or 100% in an n-dimensional color space. For example, a CMY ink set would present $2^3=8$ Neugebauer Primaries consisting of W (blank) C (cyan at 100%), M (magenta at 100%), Y (yellow at 100%), CM (cyan and magenta overprinted at 100%), CY (cyan and yellow overprinted at 100%), MY (magenta and yellow overprinted at 100%), and CMY (cyan, magenta and yellow overprinted at 100%). Given measurements of Neugebauer Primaries and knowing the relative (percentage) area covered by each, the resulting color can be computed as a simple weighted sum, $T=\Sigma T(NP_i)*\alpha_i$, where $T\in\{X,Y,Z\}$, $\alpha_i$ is the percentage area coverage of the i-th Neugebauer Primary, and $T(NP_i)$ a tristimulus value of that same NP. The tristimulus values of a color are the amounts of three primary colors in the CIEXYZ three component additive color model, needed to match a given test color.

In one implementation, ink limits may be included in each Neugebauer Primary (NP). For example, if a printer within printing system 100 can dispense two drops of a single ink at a given halftone pixel, this may be too much for the type of substrate that printing system 100 is printing on. Therefore, the ink amounts may be defined within each NP to provide optimal color for a given printing system corresponding to a specific substrate. For example, a specific Neugebauer Primary (NP) may be defined to utilize 1.5 drops of the color cyan and 1 drop of magenta. While this could not be achieved at a single halftone pixel, utilizing a mean amount over several halftone pixels would allow such a color combination to be used.

The first process, color separation, is illustrated in FIG. 2. At block 202, device-dependent RGB (dRGB) values or device-independent CIEXYZ values are received as an input to the process. At block 206, the device-dependent dRGB values or the device-independent CIEXYZ values are assigned a $2^n$ dimensional vector. Because the dRGB vector is device-dependent, different devices reproduce a given RGB value using a different dRGB vector. Moreover, because the color elements (such as pigments or dyes) vary from manufacturer to manufacturer, or even their effectiveness in the same device may vary over time, the $2^n$ dimensional vector is specific to the printing device 108 in printing system 100. At block 206, a $2^n$ dimensional vector is formulated as a Neugebauer Primary area coverage (NPac) vector in the Neugebauer space.

FIG. 2 further illustrates the second process, halftoning. In a typical printing system, the printing system 100 needs to be instructed where to distribute drops of ink and where not to distribute drops of ink. In one implementation, the color separation, as discussed above with respect to the first main step, communicates with a halftoning method to determine where the ink should be distributed on substrate 116 within the printing system 100.

At block 208, device state error diffusion (DSED) is utilized as one example of a halftoning technique. In other implementations, other halftoning methods may be used. In DSED, the device state indicates what the specific printer 108 of the printing system 100 is capable of at a single halftone pixel, where the capabilities are described by the NPs. For example, a certain distribution of NPs, each with corresponding relative area coverages (i.e., an NPac), is specified for each pixel. However, each pixel may only have one corresponding NP and therefore only one corresponding color. For instance, if the printing device 108 attempts to have 50% of a cyan ink and 50% of a magenta ink at a single pixel and the halftoning chooses to use the magenta NP at that pixel, there will be 50% too little of the cyan ink and 50% too much of the magenta ink, and an error will therefore be the result. What the single pixel does not use will be distributed or diffused using known error diffusion methods to one or more neighboring pixels. Example error diffusion methods include, but are not limited to, error randomization, serpentine processing, and the like.

In one implementation, halftoning 208 is used to define a spatial arrangement 210 of the Neugebauer Primaries (NP) specified in the input NP area coverage (NPac) vectors. The spatial arrangement generates corresponding halftone patterns for NPs 212 according to the given area coverage as defined by the corresponding NPac.

It should be noted that while the printing process 200 is described in the context of image processing in a computing environment, it can be employed in other contexts and environments involving other types of data processing without departing from the spirit and scope of the claimed subject matter.

Exemplary Method for Obtaining Convex Hull

A color gamut is a range of colors producible or available in a printing process or with a given device. Thus, different color reproduction techniques and different printing systems have different color capabilities or gamuts.

The hull of the gamut in an n-dimensional space can be either convex or concave. Traditionally, print colors controlled using ink amounts often result in a concave surface of the hull. A concave hull exhibits a more limited range of colors than a convex hull. It is therefore desirable for the color gamut to be a convex hull, providing access to a larger range of colors within the given color space. Other advantages to a convex hull may include the computational simplicity that convexity affords compared to concave gamuts or gamuts of unknown geometry.

Figure 3:
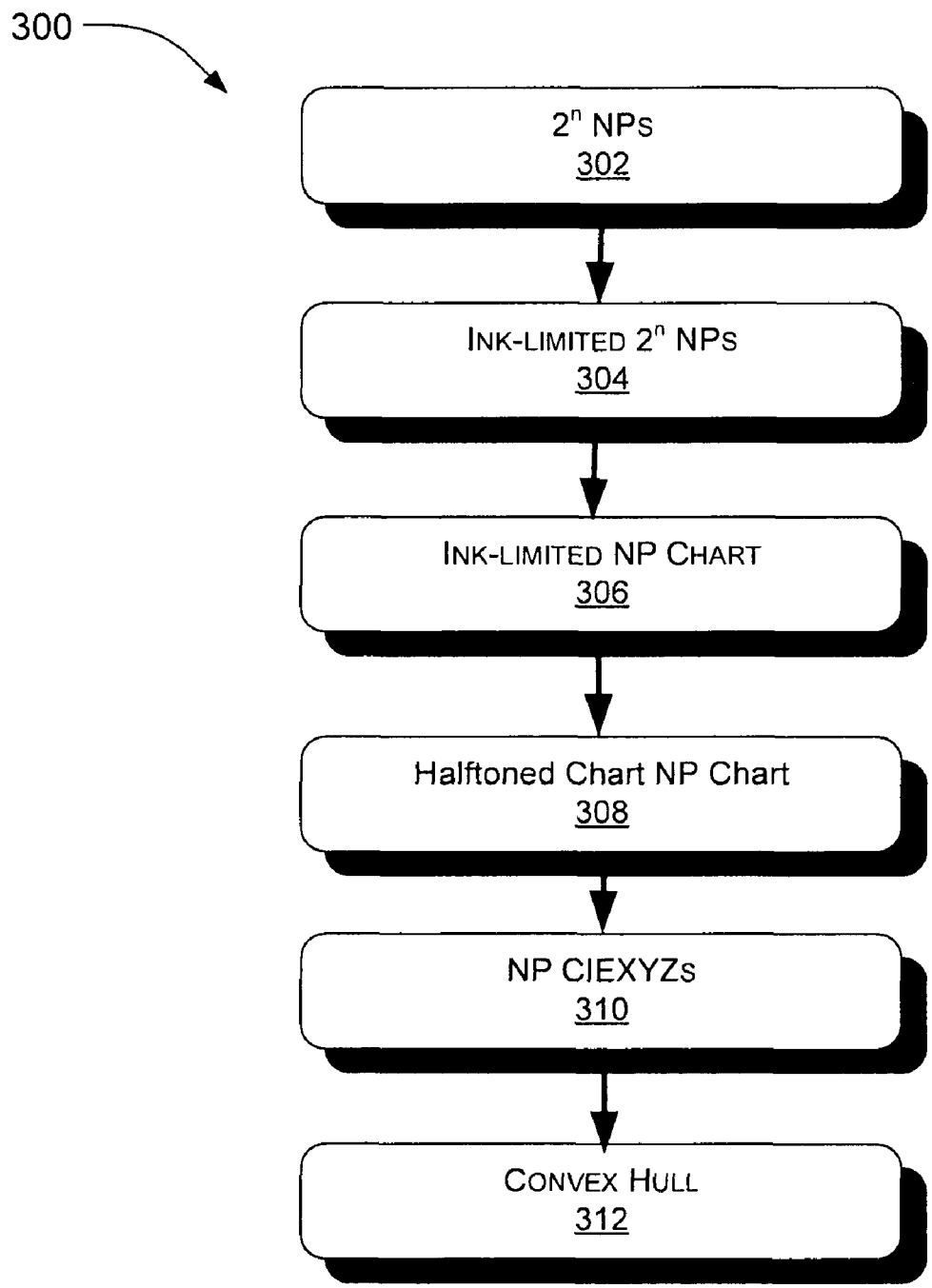
FIG. 3 illustrates an exemplary implementation of a process flow for building a minimal color separation according to the printing system of FIG. 1.

FIG. 3 illustrates an exemplary color separation process 300. In one implementation, a color separation process 300 describes a method for obtaining a convex hull using a set of NPs. At block 302, $2^n$ dimensional vectors define colors within a color space. In one example, the $2^n$ dimensional vectors are Neugebauer Primaries (NPs). At block 304, ink limits are applied to the set of $2^n$ Neugebauer Primaries (NPs) defined in block 302. Ink limits are maximum ink amounts within a defined area, providing optimal color and other physical properties for printing system 100 within that defined area. At block 306, an ink-limited NP chart is built using the ink-limited $2^n$ Neugebauer Primary (NP) values. It is to be appreciated that steps 302 through 306 set-up the color separation process as described above with respect to FIG. 2. However, in other implementations, other color separation processes may be used. At block 308, a halftoning chart is built. At block 310, the Neugebauer Primaries' (NPs') measurements can be expressed in a color space. For example, the color space may be a CIEXYZ color space. At block 312, the convex hull is defined by the color space coordinates of one or more of the Neugebauer Primaries (NPs).

An example color separation process 300 for a printing system 100 may include 11 available inks on a binary printing device 108. The 11 available inks will produce $2^{11}$, or 2048 Neugebauer Primaries (NPs) within the color gamut. However, the convex hull may be calculated by choosing the number of NPs enclosing all of the available colors to the printer. In this example, 16 Neugebauer Primaries (NPs) are chosen where these 16 NPs are vertices of the entire convex hull of the gamut. However, in other implementations, any number of NPs may be necessary to enclose the convex hull of the gamut. In this example, those 16 NPs include: W (blank paper), c (light cyan), M (magenta), Y (yellow), R (red), G (green), V (violet), m (light magenta), cY, cG, cV, Mm, YR, YG, KN (black and gray overprinted), Rm. Note that these combinations include no more than 2 inks. Therefore, any color within the color gamut may then be matched using the vertices of up to four of these 16 Neugebauer Primaries (NPs).

The given set of Neugebauer Primaries (NPs) can be convexly combined to describe the corresponding NPac. All of the possible combinations will by definition form a convex gamut. Therefore, the resulting available color range of a printing system 100 will be broader when utilizing NPacs to control it.

Tessellation

Figure 4:
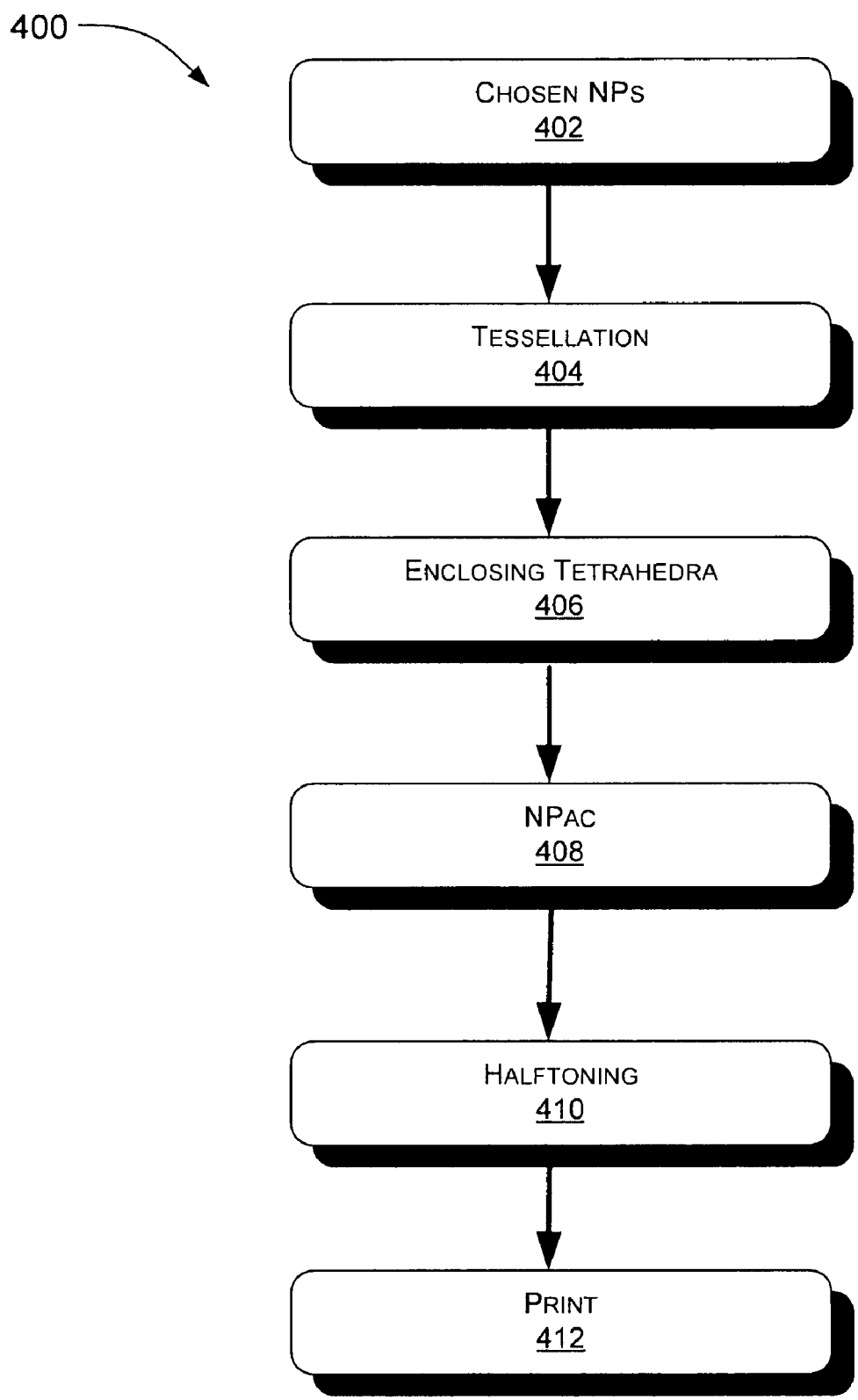
FIG. 4 further illustrates an exemplary implementation of a process flow for printing an image according to the minimal color separation of FIG. 3.

FIG. 4 further illustrates an exemplary color separation process 400 coupled with a halftoning process. At block 402, the number of Neugebauer Primaries (NPs) that enclose the convex hull are chosen. At block 404, a tessellation technique is applied to the chosen NPs and any other NPs or NPacs that may be added to them. These additional NPs or NPacs do not increase color range but may improve other print attributes, for example, grain, color constancy, ink use, and the like.

A tessellation is a collection of polytopes (e.g., polygons in two dimensions, polyhedra in three dimensions) that fill the convex hull of the color gamut with no overlaps or gaps. In one implementation, the tessellation is performed using the Delaunay Tessellation technique. In other implementations, other tessellation techniques may be used. As discussed above, because the NPs can be combined convexly and relate to colorimetry in a linear color space, the tessellation technique may be any geometric tessellation technique.

In one implementation, at block 406, a set of tetrahedra that span the convex hull of the color gamut are determined. The set of tetrahedra making up the color gamut are in essence the color separation discussed above. For example, for any color within the convex hull that is accessible, the tetrahedron that encompasses that color can be found. At block 408, the Neugebauer Primary area coverage (NPac) is determined. For example, by expressing that color in terms of the corresponding barycentric coordinates defined by the vertices of the enclosing tetrahedron, the barycentric coordinates are the area coverages for the corresponding tetrahedron vertex NPs, or NPacs. Given any pair of NPac vectors, any color along the line between their colors in the color space can be obtained by, resulting in a smooth transition between the various colors in the color space. Following this exemplary color separation process, at block 410, an exemplary halftoning process is performed. At block 412 the image is printed.

Reflectance

In another implementation, the printing process discussed above may be used in the context of reproducing spectral reflectance rather than color. Typically, the output of color imaging devices exhibit color differences between their outputs due to the differences of their color components. For example, the color display generally involves an additive model while the printing process involves a subtractive model. Generally, additive and subtractive color applications as well as their individual instances result in spectral reflectances that are different. Additionally, in a subtractive color application, vast color differences may result, depending upon the given illuminating light source. Utilizing NPac values, any specific spectral reflectance from within the convex hull established using the NPs' spectral reflectances may be obtained in an analogous manner as that discussed above to color printing on a substrate, simply by operating in spectral reflectance space instead of a color space. For example, in the reproduction of fine art, this process would enable better reproduction of an original's appearance under a variety of illuminations and therefore a more accurate reproduction.

Benefits

The move from ink vectors to Neugebauer Primary area coverage (NPac) vectors has a host of benefits derived from the fact that NPac members represent NP area coverage percentages and relate linearly to changes in the resulting printing process product's measurements. Benefits include, but are not limited to, convex gamuts, easier optimization, smooth transitions, and easier integration in high dynamic range workflows.

Convex gamuts, as discussed above, given a set of Neugebauer Primaries (NPs), any color within the color space gamut hull can be obtained by computing weights for the corresponding NPs (or NPacs). The maximum possible gamut boundary on an ink set is obtained by computing the convex hull, tessellating utilizing a tessellation technique, computing the linear weights of the polygon used in the tessellation technique, and assigning weights to the vertices of the polygons. The result being the NP area coverage or NPac vector.

Every color within the gamut produced using the Halftone Area Neugebauer Separation (HANS) color process can be obtained by as many NPac combinations as there are convex polytopes that enclose it. The alternative NPac vectors that correspond to a given color are the space from which a choice may be made. One of the choices may use less ink, one of the choices may be most color constant, and one of the choices may be closest to the spectral reflectance of an original. Coupled with the fact that all of the NPacs are accessible using HANS, optimization is not only more efficient, but also potentially more successful.

As discussed above, given any pair of NPac vectors, any color along the line between colors in the color space can be obtained by linearly weighting that pair of NPacs, resulting in a smooth transition between the various colors in the color space. Such smoothness derives from the fact that it is area coverages that are linearly weighted, which in turn relate linearly to color space values.

This linear approach also provides simpler integration of High Dynamic Range (HDR) imaging into a printing system. HDR is fundamentally based in a luminance-linear domain. Thus, HDR is able to drive a printer, such as printer 108 in printing system 100, linearly. Therefore, the linearity of the approach discussed above enables a more straightforward integration of the printer into the printing system.

Exemplary Computing Environment

Figure 5:
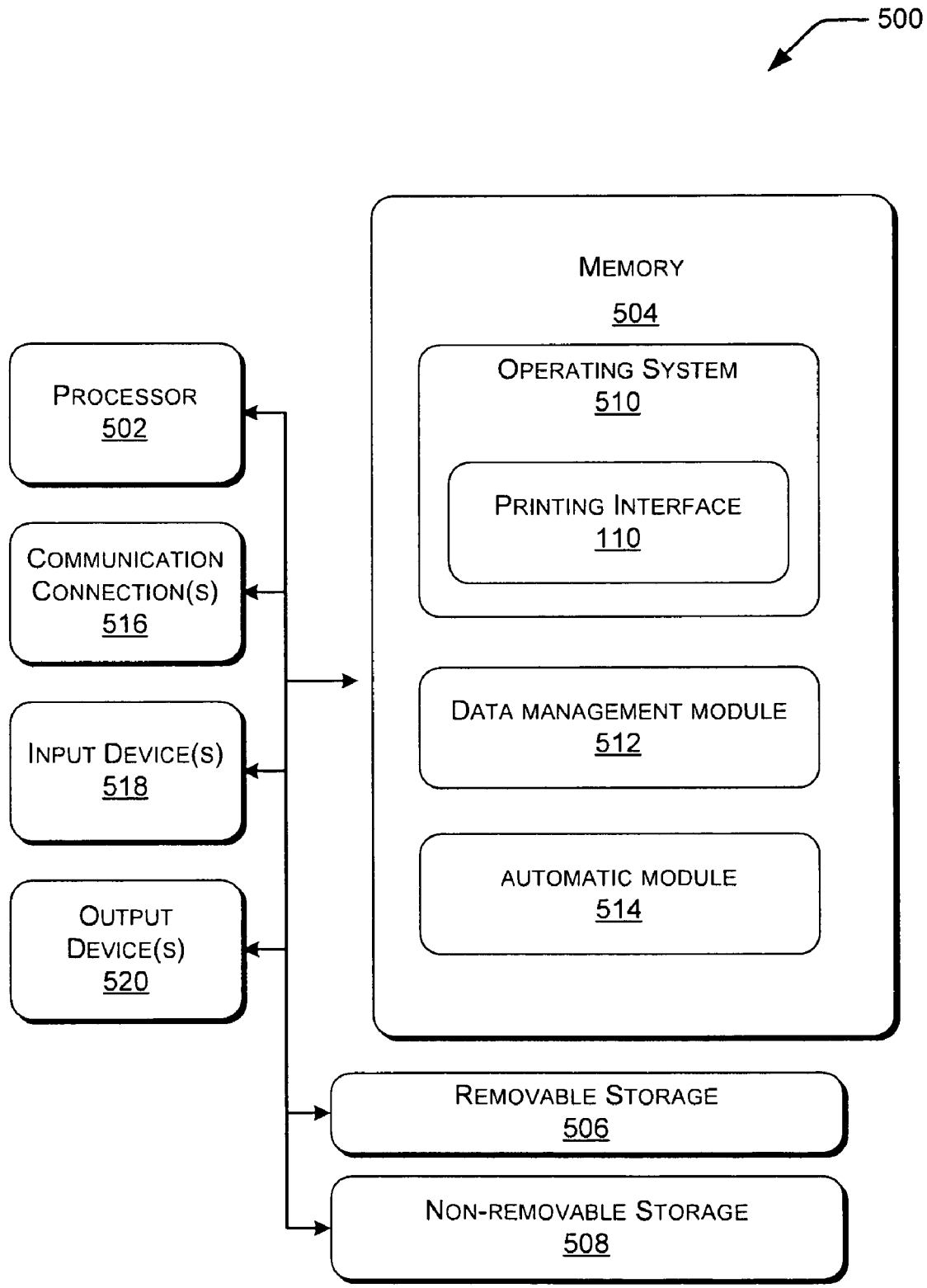
FIG. 5 illustrates a block diagram for an exemplary computing environment according to the printing system of FIG. 1.

FIG. 5 is a schematic block diagram of an exemplary general operating system 500. The system 500 may be configured as any suitable system capable of implementing interactive user interface 110 and associated color processes. In one exemplary configuration, the system comprises at least one processor 502 and a memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The system may also include additional removable storage 506 and/or non-removable storage 508 including, but not limited to, magnetic storage, optical disks, and/or tape storage. The disk drives and their associated computer-readable medium may provide non-volatile storage of computer readable instructions, data structures, program modules, and other data for the communication devices.

Memory 504, removable storage 506, and non-removable storage 508 are all examples of the computer storage medium. Additional types of computer storage medium that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 102.

Turning to the contents of the memory 504 in more detail, may include an operating system 510 printing interface 110. For example, the system 500 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 504 includes the printing interface 110a data management module 512, and an automatic module 514. The data management module 512 stores and manages storage of information, such as images, ROI, equations, and the like, and may communicate with one or more local and/or remote databases or services. The automatic module 514 allows the process to operate without human intervention.

The system 500 may also contain communications connection(s) 516 that allow processor 502 to communicate with servers, the user terminals, and/or other devices on a network. Communications connection(s) 516 is an example of communication medium. Communication medium typically embodies computer readable instructions, data structures, and program modules. By way of example, and not limitation, communication medium includes wired media such as a wired network or direct-wired connection, and wireless media such as acoustic, RF, infrared and other wireless media. The term computer readable medium as used herein includes both storage medium and communication medium.

The system 500 may also include input device(s) 518 such as a keyboard, mouse, pen, voice input device, touch input device, etc., and output device(s) 520, such as a display, speakers, printer, etc. The system 500 may include a database hosted on the processor 502. All these devices are well known in the art and need not be discussed at length here.

CONCLUSION

Although embodiments for printing in a printing system have been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method for color printing, the method comprising:
    performing a color separation process on an original image to yield a Neugebauer Primary vector image in the form of a distribution of Neugebauer Primary area coverage vectors;
    performing a halftoning process on said vector image to yield a halftoned Neugebauer Primary image; and
    printing said halftoned Neugebauer Primary image.

2. The method as recited in claim 1, wherein area coverages of Neugebauer Primaries are determined to be linear with respect to a device-independent color space.

3. The method as recited in claim 1, wherein the half-toning process is a device state error diffusion process.

4. The method as recited in claim 1, wherein the area coverages of Neugebauer Primaries are used to calculate a resulting color, wherein the calculation is performed using a weighted sum, $$T=\Sigma T(NP_i)*\alpha_i.$$

5. A computer-implemented method of addressing a printer, the method comprising:
    sending an image to a printing device;
    determining a device red, green, blue (dRGB) vector for each pixel of the image;
    assigning a Neugebauer Primary area coverage (NPac) vector to the dRGB vector, wherein the NPac vector comprises a $k^n$ dimensional vector, wherein each vector represents one or more n inks, each of the n ink comprise a corresponding k level; and
    mapping each pixel of the image according to the NPac vector.

6. The method as recited in claim 5, wherein the $k^n$ dimensional vector comprises a linear set of one or more Neugebauer Primaries (NPs).

7. The method as recited in claim 6, wherein the mapping of each pixel produces a color gamut comprising a convex hull in a color space.

8. The method as recited in claim 7, wherein the convex hull is determined by choosing one or more NPs representing one or more available colors of a printing device.

9. The method as recited in claim 8 further comprising performing a tessellation, wherein the tessellation comprises a set of tetrahedra making up the color gamut such that any color within convex hull is accessible by a polytope that encompasses that color.

10. A product comprising non-transitory computer-readable storage media encoded with instructions that, when executed, direct a processor to perform a method comprising:
    accessing an image;
    performing a color separation process on the image, wherein the color separation process comprises:
    determining Neugebauer Primary area coverage (NPac) vectors corresponding to RGB vectors;
    tessellating the NPac vectors; and
    communicating the one or more NPacs to a halftoning process.

11. A product as recited in claim 10, wherein the tessellating includes one or more tetrahedra enclosing the one or more colors of a convex hull.

12. A product as recited in claim 11, wherein the convex hull includes all of one or more colors available on a printing device.

13. A product as recited in claim 12, wherein said method further includes calculating one or more lines of the tetrahedra, wherein the one or more lines lie between the one or more colors of the convex hull.

14. A product as recited in claim 11 further comprising providing a substrate to the printing device.

15. A product as recited in claim 10 wherein said method further includes determining one or more Neugebauer Primary area coverage (NPac) vectors corresponding to one or more spectral reflectance vectors, wherein the one or more NPs' area coverages are linear with respect to a spectral reflectance space.

16. A product comprising non-transitory storage media encoded with code to, when executed by a processor:
    perform a color separation process on an original image to yield a Neugebauer Primary vector image in the form of a distribution of Neugebauer Primary area coverage vectors;
    perform a half-toning process on said vector image to yield a half-toned Neugebauer Primary image; and
    print said half-toned Neugebauer Primary image.

* * * * *

UNITED STATES PATENT AND TRADEMARK OFFICE
CERTIFICATE OF CORRECTION

PATENT NO. : 8,213,055 B2
APPLICATION NO. : 12/390214
DATED : July 3, 2012
INVENTOR(S) : Jan Morovic et al.

It is certified that error appears in the above-identified patent and that said Letters Patent is hereby corrected as shown below:

On the face page, in field (54), and in column 1, line 1, Title, delete "SEPARATION INTO" and insert -- SEPARATION, HALFTONING, AND PRINTING USING --, therefor.

Signed and Sealed this
Fifteenth Day of January, 2013

David J. Kappos
*Director of the United States Patent and Trademark Office*